United States Patent
Chakkravarthy et al.

(10) Patent No.: US 9,547,460 B2
(45) Date of Patent: Jan. 17, 2017

(54) METHOD AND SYSTEM FOR IMPROVING CACHE PERFORMANCE OF A REDUNDANT DISK ARRAY CONTROLLER

(71) Applicant: Dell Products, LP, Round Rock, TX (US)

(72) Inventors: Kavi K. Chakkravarthy, Vellore (IN); Neeraj Joshi, Mudlia (IN); Vishnu M. Karrotu, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 93 days.

(21) Appl. No.: 14/572,096

(22) Filed: Dec. 16, 2014

(65) Prior Publication Data

US 2016/0170685 A1    Jun. 16, 2016

(51) Int. Cl.
| | |
|---|---|
| *G06F 12/00* | (2006.01) |
| *G06F 3/06* | (2006.01) |
| *G06F 12/08* | (2016.01) |
| *G06F 12/02* | (2006.01) |

(52) U.S. Cl.
CPC ........... *G06F 3/0689* (2013.01); *G06F 3/0619* (2013.01); *G06F 3/0653* (2013.01); *G06F 12/0238* (2013.01); *G06F 12/0246* (2013.01); *G06F 12/0802* (2013.01); *G06F 12/0866* (2013.01); *G06F 12/0875* (2013.01); *G06F 12/0888* (2013.01); *G06F 2212/1032* (2013.01); *G06F 2212/604* (2013.01)

(58) Field of Classification Search
CPC .... G06F 3/0689; G06F 3/0619; G06F 3/0653; G06F 12/0238; G06F 12/0246; G06F 12/0802; G06F 12/0866; G06F 12/0875; G06F 12/0888; G06F 2212/1032; G06F 2212/604

See application file for complete search history.

(56) References Cited

U.S. PATENT DOCUMENTS

| | | | |
|---|---|---|---|
| 5,307,477 | A | 4/1994 | Taylor et al. |
| 7,039,765 | B1 | 5/2006 | Wilkes |
| 7,406,619 | B2 | 7/2008 | Lynn |
| 8,775,731 | B2 | 7/2014 | McHale et al. |
| 2003/0145165 | A1* | 7/2003 | Herbst .................. G06F 3/0601 711/112 |

(Continued)

OTHER PUBLICATIONS

U.S. Appl. No. 14/144,751, filed Dec. 31, 2013.

*Primary Examiner* — Shawn X Gu
(74) *Attorney, Agent, or Firm* — Larson Newman, LLP

(57) ABSTRACT

An information handling system includes a method, information handling system, and redundant array of independent disks (RAID) controller. When a write request is received, data are written to a non-volatile memory write cache. When a read request is received, it is determined whether the data are available from a volatile memory read cache. When the data are available from the volatile memory read cache, the data are obtained from the volatile memory read cache and provided in response to the read request. When the data are not available from the volatile memory read cache, the data are obtained from a RAID virtual disk coupled to the RAID controller, the data are stored in the volatile memory read cache, and the data are provided in response to the read request.

17 Claims, 3 Drawing Sheets

(56) References Cited

U.S. PATENT DOCUMENTS

2007/0220201 A1\* 9/2007 Gill .................. G06F 12/123
                                                711/113
2008/0091877 A1\* 4/2008 Klemm ................ G06F 3/061
                                                711/114

\* cited by examiner

METHOD AND SYSTEM FOR IMPROVING CACHE PERFORMANCE OF A REDUNDANT DISK ARRAY CONTROLLER

FIELD OF THE DISCLOSURE

The present disclosure generally relates to information handling systems, and more particularly relating to improving storage controller cache performance.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

One subsystem of an information handling system is a storage subsystem. A storage subsystem can be implemented using a redundant array of independent disks (RAID). A RAID storage subsystem comprises a RAID controller and a disk group (DG). The DG comprises a plurality of physical disks (PDs) configured to store information which is presented to the information handling system as being stored on a virtual disk (VD) even though the storage of the information is distributed among the PDs.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Cache memory is used in RAID controllers to provide better write and read input/output per second (IOPS) storage performance without incurring the latencies involved with accessing physical drives, such as hard disk drives (HDD). However, existing cache architectures impose constraints that limit performance. In accordance with an embodiment, a RAID controller includes a non-volatile memory configured as a non-volatile memory write cache and a volatile memory configured as a volatile memory read cache. By using a non-volatile memory configured as a non-volatile memory write cache, data not yet written to a RAID virtual disk is retained in the non-volatile memory in the event of an abrupt system power failure. Upon detection of a system power failure, the non-volatile memory write cache can be restored to its former state prior to the system power failure based on the retained contents of the non-volatile memory, and the volatile memory read cache can be flushed to reset its state to an empty state. Thus, the RAID storage subsystem can endure a system power failure without loss of unwritten data yet to be written to a RAID virtual disk.

By implementing the read cache as a volatile read cache, the read cache memory capacity can be increased (for example, beyond two gigabytes (2 GB)), as the practical limitations imposed by the use of non-volatile memory to implement a read cache are avoided. Such practical limitations can include the energy storage necessity for cache memory to retain data on abrupt system power failure with non-volatile memories using a battery back up (BBU) or super capacitors, where a larger non-volatile memory requires a higher capacity battery or higher capacity super capacitor to retain a larger amount of stored data.

Figure 1:
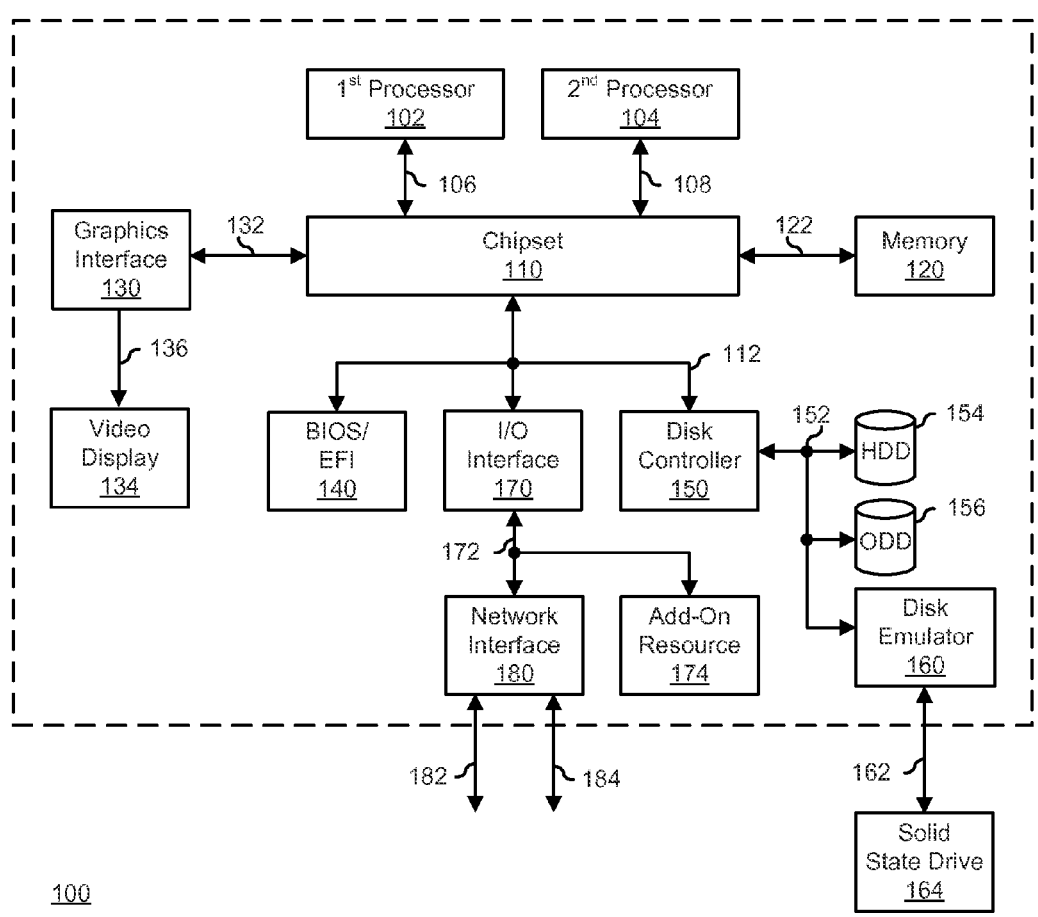
FIG. 1 is a block diagram illustrating an information handling system according to an embodiment of the present disclosure.

FIG. 1 is a block diagram illustrating an information handling system according to an embodiment of the present disclosure. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a small computer serial interface (SCSI) interface, a serial attached SCSI (SAS) interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
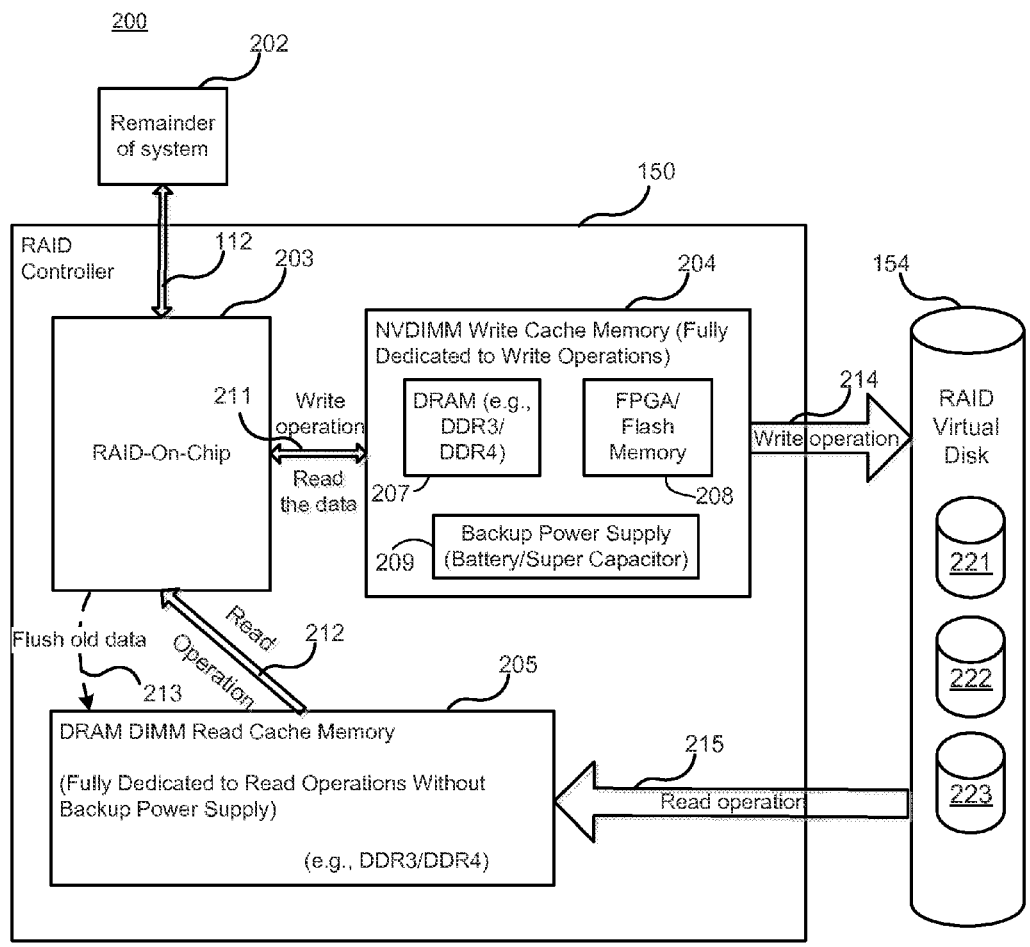
FIG. 2 is a block diagram illustrating a storage subsystem comprising a RAID controller and a RAID virtual disk according to an embodiment of the present disclosure.

FIG. 2 shows a storage subsystem comprising a RAID controller and a RAID virtual disk according to an embodiment of the present disclosure. Storage subsystem 200 comprises disk controller 150, which is a RAID controller, and hard disk drive 154, which is a RAID virtual disk. RAID controller 150 includes RAID control circuits 203, non-volatile memory 204, and volatile memory 205. RAID control circuits 203 may be implemented, for example, on an integrated circuit and referred to as RAID-on-a-chip. RAID control circuits 203 are connected to the remainder 202 of the system 100, via I/O channel 112, as shown in FIG. 1.

RAID virtual disk (VD) 154 is virtual disk physically implemented in a disk group (DG) of several physical disks (PDs) 221, 222, and 223, according to an embodiment of the present disclosure. RAID storage subsystem 200 includes, from a physical perspective, the DG which includes PDs 221, 222, and 223. RAID controller 150 presents information stored on PDs 221, 222, and 223 of the DG as being stored on VD 154 in accordance with a RAID mapping established by RAID control circuits 203. Thus, RAID storage subsystem 200 includes, from a logical perspective, VD 154.

Non-volatile memory 204 implements a write cache for storing data to be written to RAID virtual disk 154. The write cache is exclusively dedicated to write operations. Non-volatile memory 204 may be, for example, a non-volatile dual inline memory module (NVDIMM) or several such modules. Non-volatile memory 204 may include, for example, a dynamic random access memory (DRAM) 207, such as a dual data rate 3 (DDR3) or dual data rate 4 (DDR4) DRAM, a field programmable gate array (FPGA) or flash memory 208, and a backup power supply 209, such as a battery or super capacitor, such as a double layer capacitor, a pseudo capacitor, or a hybrid capacitor, which exhibits much higher capacitance than typical capacitors, for example, a capacitance of greater than a tenth of a farad. RAID control circuits 203 are connected to non-volatile memory 204 via a write cache bus 211. Non-volatile memory 204 is connected to a portion 214 of disk interface 152 for use in write operations.

During a write operation, data to be written to RAID virtual disk 154 are communicated from the remainder 202 of system 100 to RAID control circuits 203 via I/O channel 112. RAID control circuits 203 communicate the data via write cache bus 211 to non-volatile memory 204, where the data are stored before being written to RAID virtual disk 154 via portion 214 of disk interface 152. By utilizing non-volatile memory 204 for such storage, such data need not be immediately written to RAID virtual disk 154, as non-volatile memory 204 assure such data will not be lost if, for example, power is lost to RAID controller 150 prior to writing the data to RAID virtual drive 154.

Volatile memory 205 implements a read cache for storing data read from RAID virtual disk 154. The read cache is exclusively dedicated to read operations. Volatile memory 205 may be, for example, a dynamic random access memory (DRAM) dual inline memory module (DIMM) or several such modules, such as DDR3 or DDR4 DRAM modules without a backup power supply. RAID control circuits 203 are connected to volatile memory 205 via a read cache bus 212. RAID control circuits 203 are also connected to volatile memory 205 via a flush interface 213 to allow RAID control circuits 203 to command volatile memory 205 to flush old data stored in volatile memory 205. Volatile memory 205 is connected to a portion 215 of disk interface 152 for use in read operations.

During a read operation, data to be read from RAID virtual disk 154 are requested by the remainder 202 of system 100 to RAID control circuits 203 via I/O channel 112. RAID control circuits 203 check to see whether the requested data are available from volatile memory 205 without having to access RAID virtual disk 154. For example, the requested data may be available from volatile memory 205 if the data were recently read from RAID virtual disk 154 and no flush has been performed on volatile memory 205 since the data were read from RAID virtual disk 154 and stored in volatile memory 205. If so, RAID control circuits 203 obtain the requested data from volatile memory 205. RAID control circuits 203 can also check to see whether the requested data are available from non-volatile memory 204 without having to access RAID virtual disk 154. For example, the requested data may be available from non-volatile memory 204 if the requested data were recently communicated to RAID controller 150 for a write operation. If so, RAID control circuits 203 obtain the requested data from non-volatile memory 204. RAID control circuits 203 are connected to disk interface 152. If the requested data are not available in either the volatile memory 205 or the non-volatile memory 204, RAID control circuits 203 communicate the request to RAID virtual disk 154 via disk interface 152, the data are retrieved from RAID virtual disk 154, the data are stored in volatile memory 205 so they will be cached and readily available if requested by a subsequent read request, and the data are provided by the RAID storage subsystem to the system in response to the read request. Volatile memory 205, used to cache data read from RAID virtual disk 154, need not be non-volatile and retain data in the event of loss of system power, as RAID control circuits 203 immediately provide any data requested by the system, regardless of whether the data are obtained from RAID virtual disk 154 or from a cache, such as volatile memory 205. In the event of loss of system power, RAID control circuits detect the loss of system power and command volatile memory 205 to flush its contents, thereby resetting itself to an empty state, via flush interface 213. While such a power failure can temporarily reduce performance by requiring subsequent read requests that could otherwise have been performed by retrieving the requested data from volatile memory 205 to be performed by retrieving the requested data from RAID virtual disk 154, once volatile memory 205 is sufficiently repopulated with requested data, higher performance is restored as more read requests can be satisfied with data stored in volatile memory 205, avoiding the need to retrieve the data from RAID virtual disk 154. In the event of loss of system power, RAID control circuits 203 wait and detect restoration of system power, then use the preserved state of non-volatile memory 204 to reestablish a write cache containing the data that had been stored to non-volatile memory 204 before the loss of system power but not yet written to RAID virtual disk 154. Thus, the integrity of data transfer is protected by using non-volatile memory 204 as a write cache and volatile memory 205 as a read cache.

Figure 3:
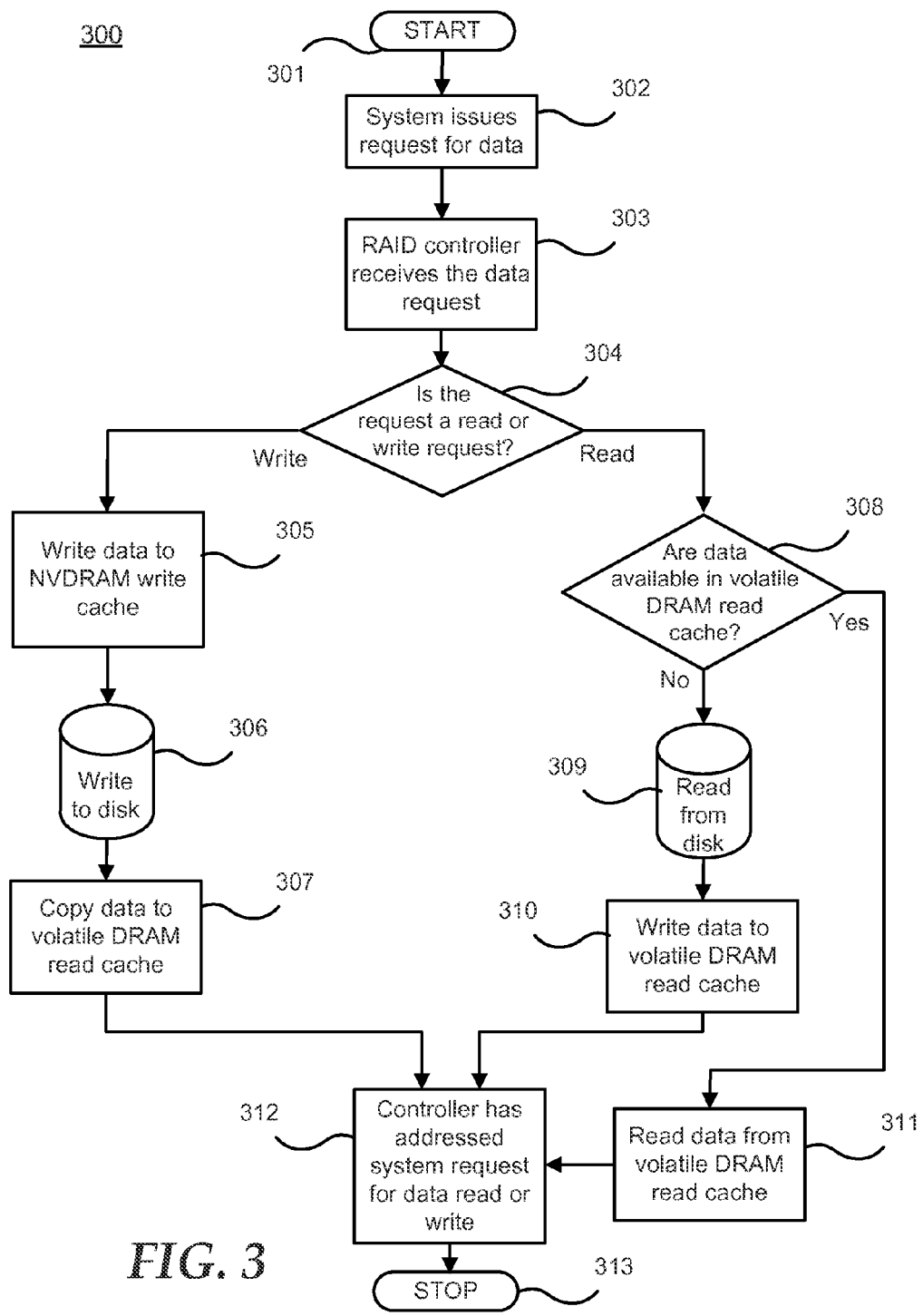
FIG. 3 is a flow diagram illustrating a method for improving cache performance of a RAID controller according to an embodiment of the present disclosure.

FIG. 3 shows a method for improving cache performance of a RAID controller according to an embodiment of the present disclosure. Method 300 begins in block 301 and continues to block 302. In block 302, the system issues a request for a data transfer operation to the RAID controller of the storage subsystem. From block 302, method 300 continues to block 303. In block 303, the RAID controller receives the request for the data transfer operation. From block 303, method 300 continues to decision block 304. In decision block 304, a decision is made as to whether or not the request is a read request or a write request. If the request is a write request, method 300 continues to block 305. In block 305, the RAID controller writes the data to a non-volatile memory write cache, such as a NVDRAM write cache. From block 305, method 300 continues to disk operation block 306, where the RAID controller writes the data to a RAID virtual disk. Since the non-volatile memory write cache is implemented in non-volatile memory, disk operation block 306 need not occur immediately after block 305 and can be delayed, for example, to improve performance of the RAID storage subsystem. The non-volatile nature of the non-volatile memory write cache protects the data and prevents the data from being lost prior to being written to the RAID virtual disk even in the event of a disruption such as a loss of system power. From disk operation block 306, method 300 continues to block 307. In block 307, a copy of the data is written to a volatile memory read cache so that the data will be cached in case a subsequent read operation requires the data. Optionally, block 307 may be omitted, for example, when retaining a copy of the written data in cache is not desired or when both the write cache and the read cached are checked for cached data requested by a read request. From block 307 (or from disk operation block 306 if block 307 is omitted), method 300 continues to block 312. In block 312, the RAID controller has successfully completed the write request from the system. From block 312, method 300 continues to block 313, where it ends.

If, in decision block 304, the decision is made that the request is a read request, method 300 continues to decision block 308. In decision block 308, a decision is made as to whether or not the requested data are available in the volatile read cache. If so, method 300 continues to block 311, where the data are read from the volatile read cache and provided to the system in response to the read request. From block 311, method 300 continues to block 312. In block 312, the RAID controller has successfully completed the read request from the system. From block 312, method 300 continues to block 313, where it ends.

If, in decision block 308, the decision is made that the requested data are not available in the volatile read cache, the method continues to disk operation block 309, where the data are read from the RAID virtual disk. From block 309, the method continues to block 310. In block 310, the data are written to the volatile read cache so that the data will be cached in case a subsequent read operation requires the data. From block 310, method 300 continues to block 312. Between blocks 309 and 312, the data are provided to the system in response to the read request. In block 312, the RAID controller has successfully completed the read request from the system. From block 312, method 300 continues to block 313, where it ends.

As mentioned above with respect to block 307, block 307 may be omitted, for example, when both the write cache and the read cached are checked for cached data requested by a read request. In such case, decision block 308 can include determining whether the requested data are available in either the volatile read cache or the non-volatile write cache. If the data are not available in either the volatile read cache or the non-volatile write cache, the method continues to disk operation block 309, as described above. If the data are available in the volatile read cache, the method continues to block 311, as described above. If the data are available in the non-volatile write cache, the data are read from the non-volatile write cache and provided to the system in response to the read request. Then, the method continues at block 312, as described above.

In accordance with at least one embodiment, a RAID controller provides a non-volatile memory write cache dedicated exclusively for storing data to be written to a RAID virtual disk and a volatile memory read cache dedicated exclusively to storing data that is not as-of-yet-unwritten data to be written to the RAID virtual disk. For example, the volatile memory read cache may be detected exclusively to storing data read from the RAID virtual disk or, as another example, storing such read data read from the RAID virtual disk and also written write data that has already been written to the RAID virtual disk, so it need no longer be retained in the non-volatile memory write cache. For example, upon receiving a write request, the RAID controller may write the data of the write request to the non-volatile memory write cache, then write the data to the RAID virtual disk, then, after writing the data to the RAID virtual disk, write the data to the volatile memory read cache and release the portion of the non-volatile memory write cache to be available to be rewritten for storage of future write data, thereby using less-resource-intensive volatile memory, rather than more-resource-intensive non-volatile memory, to cache data that has already been written to the RAID virtual disk.

As an example, a RAID controller can include non-volatile (NV) dual inline memory module (DIMM) dynamic random access memory (DRAM) exclusively dedicated to be used as a non-volatile memory write cache with 100% of its NVDRAM cache capacity used for write operation only. As an example, the RAID controller can include volatile DRAM (for example, DDR3/DDR4) exclusively dedicated to be used as a volatile memory read cache, thereby increasing overall RAID controller cache memory capacity. Even if read cache data loss occurs because of the volatility of the data stored in the volatile memory read cache, such read cache data loss does not result in complete loss of the data, as the data is still stored on and available from the RAID virtual disk on which it is stored.

In accordance with at least one embodiment, a RAID controller has at least one dedicated NVDRAM DIMM for write operations (for example, to support a write back policy) and another dedicated volatile DRAM (for example, DDR3/DDR4) for read operations. In accordance with at least one embodiment, the RAID controller provides 100% of a dedicated NVDRAM write cache for write operation only and a dedicated volatile DRAM for read operations to store data read from the RAID virtual drive if write cache doesn't already hold the requested data.

In accordance with one embodiment, a data transfer request is received from the system requesting the RAID controller to either read data from or write data to a RAID virtual disk. If the request is a write request, then the RAID controller writes the data to the dedicated non-volatile write cache and checks in the dedicated volatile read cache to see whether there is old data that may be flushed from the dedicated volatile read cache and, if so, flushes the old data, making room for new data. Then, the RAID controller writes the data to the desired RAID virtual disk. If the request is a read request, then the RAID controller first checks in the non-volatile memory write cache to see if the requested data are available from among most recently updated write data. If the requested data are available, then the RAID controller reads the data from the non-volatile memory write cache and provides the data to the system in response to the read request. If the data are not available in the non-volatile memory write cache, then the RAID controller checks in to see if the data are available from the volatile memory read cache. If so, then the RAID controller reads the data from the volatile memory read cache and provides the data to the system in response to the read request. If data are not available in the volatile memory read cache, then the RAID controller fetches the data from RAID virtual disk and stores retrieved data in the volatile memory read cache for faster read operations that request the same data in the future.

In accordance with at least one embodiment, by dedicating 100% of NVDRAM for utilization as a write cache for write operations, the RAID controller write performance can be improved while providing data loss prevention through the use of, for example, a battery, a super capacitor, or inherently non-volatile memory, such as a field programmable gate array (FPGA) or flash memory. In accordance with at least one embodiment, by using a dedicated volatile memory read cache, the RAID controller, read performance can be much faster for read ahead/adaptive read ahead policies than existing RAID controller read performance. Accordingly, web based application/sequential read applications can achieve better read performance in accordance with at least one embodiment.

In accordance with at least one embodiment, a RAID controller's overall cache memory capacity can be increased without constraints imposed by non-volatility of read cache memory. For a dedicated write cache, non-volatile memory (such as NVDIMM) can be provided with a super capacitor or battery backup unit (BBU) in accordance with at least one embodiment.

In accordance with at least one embodiment, a non-volatile memory write cache can provided with a capacity that is larger than, smaller than, or the same capacity as a volatile memory read cache. The capacity relationships between the non-volatile memory write cache and the volatile memory read cache can be selected to optimize performance.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (for example random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a data transfer request pertaining to data;
   determining whether the data transfer request is a read request or a write request;
   when the data transfer request is the write request, writing the data to a non-volatile memory write cache;
   when the data transfer request is the read request, determining whether the data are available from the volatile memory read cache;
   when the data are available from the volatile memory read cache, obtaining the data from the volatile memory read cache and providing the data in response to the read request; when the data transfer request is the read request, determining whether the data are available from the non-volatile memory write cache; and when the data are available from the non-volatile memory write cache, obtaining the data from the non-volatile memory write cache and providing the data in response to the read request; and
   when the data are not available from either the volatile memory read cache or the non-volatile memory write cache, obtaining the data from a redundant array of independent disks (RAID) virtual disk, storing the data in the volatile memory read cache, and providing the data in response to the read request.

2. The method of claim 1 further comprising:
   when the data transfer request is the write request, writing the data to the non-volatile memory write cache and writing the data to the RAID virtual disk.

3. The method of claim 2 further comprising: when the data transfer request is the write request, copying the data to the volatile memory read cache.

4. The method of claim 1 further comprising:
   detecting when a system power failure has occurred; and when the system power failure has occurred, performing a flush of the volatile memory read cache to reset the volatile memory read cache to an empty state and restoring the non-volatile memory write cache to a previous write cache state as existed before the system power failure based on a retained state of non-volatile memory of the non-volatile write cache.

5. The method of claim 1 wherein the volatile memory read cache provides a volatile memory read cache capacity of two to six times a non-volatile memory write cache capacity of the non-volatile memory write cache.

6. The method of claim 1 wherein the volatile memory read cache provides a volatile memory read cache capacity of two to four times a non-volatile memory write cache capacity of the non-volatile memory write cache.

7. An information handling system comprising:
a redundant array of independent disks (RAID) storage subsystem, the RAID subsystem comprising:
a RAID virtual disk implemented using a plurality of RAID physical disks; and
a RAID controller, the RAID controller comprising:
a non-volatile memory write cache;
a volatile memory read cache; and
RAID control circuits, the RAID control circuits configured to:
receive a data transfer request pertaining to data;
determine whether the data transfer request is a read request or a write request;
when the data transfer request is the write request, write the data to the non-volatile memory write cache;
when the data transfer request is the read request, determine whether the data are available from the volatile memory read cache;
when the data are available from the volatile memory read cache, obtain the data from the volatile memory read cache and provide the data in response to the read request;
when the data transfer request is the read request, determine whether the data are available from the non-volatile memory write cache; and
when the data are available from the non-volatile memory write cache, obtain the data from the non-volatile memory write cache and provide the data in response to the read request; and
when the data are not available from either the volatile memory read cache or the non-volatile memory write cache, obtain the data from the RAID virtual disk, store the data in the volatile memory read cache, and provide the data in response to the read request.

8. The information handling system of claim 7 wherein the RAID control circuits are further configured, when the data transfer request is the write request, to write the data to the non-volatile memory write cache and to write the data to the RAID virtual disk.

9. The information handling system of claim 7 wherein the RAID control circuits are further configured, when the data transfer request is the write request, to copy the data to the volatile memory read cache.

10. The information handling system of claim 7 wherein the RAID control circuits are further configured to:
detect when a system power failure has occurred; and
when the system power failure has occurred, perform a flush of the volatile memory read cache to reset the volatile memory read cache to an empty state and restoring the non-volatile memory write cache to a previous write cache state as existed before the system power failure based on a retained state of non-volatile memory of the non-volatile write cache.

11. The information handling system of claim 7 wherein the volatile memory read cache provides a volatile memory read cache capacity of two to six times a non-volatile memory write cache capacity of the non-volatile memory write cache.

12. The information handling system of claim 7 wherein the volatile memory read cache provides a volatile memory read cache capacity of two to four times a non-volatile memory write cache capacity of the non-volatile memory write cache.

13. A redundant array of independent disks (RAID) controller comprising:
a non-volatile memory write cache;
a volatile memory read cache; and
RAID control circuits, the RAID control circuits configured to:
receive a data transfer request pertaining to data;
determine whether the data transfer request is a read request or a write request;
when the data transfer request is the write request, write the data to the non-volatile memory write cache;
when the data transfer request is the read request, determine whether the data are available from the volatile memory read cache;
when the data are available from the volatile memory read cache, obtain the data from the volatile memory read cache and provide the data in response to the read request; when the data transfer request is the read request, determining whether the data are available from the non-volatile memory write cache; and
when the data are available from the non-volatile memory write cache, obtaining the data from the non-volatile memory write cache and providing the data in response to the read request; and
when the data are not available from either the volatile memory read cache or the non-volatile memory write cache, obtain the data from a RAID virtual disk coupled to the RAID controller, store the data in the volatile memory read cache, and provide the data in response to the read request.

14. The RAID controller of claim 13 wherein the RAID control circuits are further configured, when the data transfer request is the write request, to write the data to the non-volatile memory write cache and to write the data to the RAID virtual disk.

15. The RAID controller of claim 13 wherein the RAID control circuits are further configured, when the data transfer request is the write request, to copy the data to the volatile memory read cache.

16. The RAID controller of claim 13 wherein the volatile memory read cache provides a volatile memory read cache capacity of two to four times a non-volatile memory write cache capacity of the non-volatile memory write cache.

17. The RAID controller of claim 13 wherein the RAID control circuits are further configured to: detect when a system power failure has occurred, and when the system power failure has occurred, perform a flush of the volatile memory read cache to reset the volatile memory read cache to an empty state and restore the non-volatile memory write cache to a previous write cache state as existed before the system power failure based on a retained state of non-volatile memory of the non-volatile write cache.

* * * * *